(12) United States Patent
Loukas et al.

(10) Patent No.: US 8,923,393 B2
(45) Date of Patent: Dec. 30, 2014

(54) APPARATUS AND METHOD OF REDUCED REFERENCE FRAME SEARCH IN VIDEO ENCODING

(75) Inventors: Serafim S. Loukas, Carlsbad, CA (US); Tao Tian, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1637 days.

(21) Appl. No.: 11/555,989

(22) Filed: Nov. 2, 2006

(65) Prior Publication Data

US 2008/0130755 A1    Jun. 5, 2008

(51) Int. Cl.
*H04N 7/12*        (2006.01)
*H04N 19/51*       (2014.01)
*H04N 19/53*       (2014.01)
*H04N 19/57*       (2014.01)
*H04N 19/146*      (2014.01)
*H04N 19/119*      (2014.01)
*H04N 19/583*      (2014.01)
*H04N 19/176*      (2014.01)
*H04N 19/147*      (2014.01)
*H04N 19/61*       (2014.01)

(52) U.S. Cl.
CPC ... *H04N 19/00587* (2013.01); *H04N 19/00715* (2013.01); *H04N 19/006* (2013.01); *H04N 19/00678* (2013.01); *H04N 19/00169* (2013.01); *H04N 19/00072* (2013.01); *H04N 19/00733* (2013.01); *H04N 19/00278* (2013.01); *H04N 19/00175* (2013.01); *H04N 19/00781* (2013.01)
USPC ........... 375/240.12; 375/240.15; 375/240.16; 375/240.14; 382/236; 382/238; 382/239

(58) Field of Classification Search
USPC ............ 375/240.12, 240.15, 240.16, 240.14; 382/236, 238, 239
See application file for complete search history.

(56) References Cited

U.S. PATENT DOCUMENTS

2004/0161157 A1*  8/2004  Sato et al. ............... 382/236
2004/0218675 A1* 11/2004  Kim et al. ............. 375/240.16
2006/0062302 A1   3/2006  Yin et al.
2008/0037642 A1   2/2008  Tsuchiya et al.

FOREIGN PATENT DOCUMENTS

| JP | 2003284091 A | 10/2003 |
| KR | 20040093604 | 11/2004 |
| RU | 2117412 | 1/2004 |
| WO | WO2005094083 | 10/2005 |
| WO | WO2006001485 A1 | 1/2006 |

OTHER PUBLICATIONS

Saponara et al, "Dynamic control of Motion Estimation Search Parameters for low complex H.264 Video Coding", Feb. 2006, "IEEE Transactions on Consumer Electronics", pp. 481-482.*

(Continued)

*Primary Examiner* — Shawn An
(74) *Attorney, Agent, or Firm* — Dang M. Vo; Elaine H. Lo

(57) ABSTRACT

Aspects include systems and methods of improving processing in an encoder in a multimedia transmission system. Multimedia data may include one or more of motion video, audio, still images, or any other suitable type of audio-visual data. Aspects include an apparatus and method of encoding video data. For example, an apparatus and method of reduced reference frame search in video encoding is disclosed.

35 Claims, 7 Drawing Sheets

(56) References Cited

OTHER PUBLICATIONS

Saponara et al., "Dynamic control of Motion Estimation Search Parameters for low complex H.264 Video Coding", Feb. 2006, "IEEE Transactions on Consumer Electronics", pp. 481-482.*

International Search Report—PCT/US07/082809—International Search Authority. European Patent Office—Jun. 23, 2008.

Written Opinion—PCT/US07/082809—International Search Authority. European Patent Office—Jun. 23, 2008.

Saponara S.,et al., "Dynamic Control of Motion Estimation Search Parameters for Low Complex H. 264/AVC Video Coding," Consumer Electronics, 2006. ICCE '06. 2006 Digest of Technical Papers. International Conference on Law Vegas, NV, Jan. 7-11, 2006, IEEE, pp. 481-482.

Sullivan G.J., et al., "The H.264/AVC advanced video coding standard: overview and introduction to the fidelity range extensions," Proceedings of the SPIE, SPIE, Bellingham, VA, vol. 558, Nov. 1, 2004, pp. 454-474.

Yongfang Liang et al., "Fast motion estimation using hierarchical motion intensity structure," Multimedia and Expo, 2004. ICME '04. 2004 IEEE International Conference E on Taipei, Taiwan, Jun. 27, 2004, vol. 1, pp. 699-702.

Jan Richardson, H.264 and MPEG-4 video coding standards of the new generation, Moscow, Tekhnosfera, 2005, pp. 53-65, 274-276.

Saponara S., et al., "Dynamic Control of Motion Estimation Search Parameters for Low Complex H.264 Video Coding," IEEE Transactions on Consumer Electronics, Feb. 2006, IEEE, USA.

International Preliminary Report on Patentability—PCT/US07/082809, IPEA—US, Feb. 18, 2009.

Saponara S., et al. "Dynamic Control of Motion Estimation Search Parameters for Low Complex. H.264 Video Coding", IEEE Transactions on Consumer Electronics, IEEE, USA, Feb. 2006, vol. 52 (1), pp. 232-239.

* cited by examiner

APPARATUS AND METHOD OF REDUCED REFERENCE FRAME SEARCH IN VIDEO ENCODING

BACKGROUND

1. Field

The present application is directed to multimedia signal processing and, more particularly, to video encoding.

2. Background

Multimedia processing systems, such as video encoders, may encode multimedia data using encoding methods based on international standards such as MPEG-x and H.26x standards. Such encoding methods generally are directed to compressing the multimedia data for transmission and/or storage. Compression is broadly the process of removing redundancy from the data.

A video signal may be described in terms of a sequence of pictures, which include frames (an entire picture), or fields (e.g., an interlaced video stream comprises fields of alternating odd or even lines of a picture). As used herein, the term "frame" is broadly used to refer to a picture, a frame or a field. Multimedia processors, such as video encoders, may encode a frame by partitioning it into blocks or "macroblocks" of, for example, 16×16 pixels. The encoder may further partition each macroblock into subblocks. Each subblock may further comprise additional subblocks. For example, subblocks of a macroblock may include 16×8 and 8×16 subblocks. Subblocks of the 8×16 subblocks may include 8×8 subblocks, and so forth. As used herein, the term "block" refers to either a macroblock or a subblock.

Video encoding methods compress video signals by using lossless or lossy compression algorithms to compress each frame or blocks of the frame. Intra-frame coding refers to encoding a frame using data from that frame. Inter-frame coding refers to predictive encoding schemes such as schemes that comprise encoding a frame based on other, "reference," frames. For example, video signals often exhibit temporal redundancy in which frames near each other in the temporal sequence of frames have at least portions that match or at least partially match each other. Encoders can take advantage of this temporal redundancy to reduce the size of encoded data.

Encoders may take advantage of this temporal redundancy by encoding a frame in terms of the difference between the frame and one or more reference frames. For example, video encoders may use motion compensation based algorithms that match blocks of the frame being encoded to portions of one or more other frames. The block of the encoded frame may be shifted in the frame relative to the matching portion of the reference frame. This shift is characterized by a motion vector. Any differences between the block and partially matching portion of the reference frame may be characterized in terms of a residual. The encoder may thus encode a frame as data that comprises one or more of the motion vectors and residuals for a particular partitioning of the frame. A particular partition of blocks for encoding the frame may be selected by approximately minimizing a cost function that, for example, balances encoding size with distortion to the content of the frame resulting from an encoding.

Reference frames may include one or more prior frames of the video signal or one or more frames that follow the frame in the video signal. The H.264 standard, for example, specifies use of five reference frames in searching for the best matching block. In general, searching of more reference frames increases the ability of the encoder to find portions of one of the reference frames that closely matches the block of the frame being encoded. Better matches have a smaller difference to encode, which generally results in a more compact encoding. However, in order to find matching portions of the reference frame for a block, the encoder must search each the reference frames for each block (e.g., macroblocks and subblocks) of the frame being encoded. Because the matching portion may be shifted, the encoder generally performs a large number of comparisons for each reference frame. As a result, encoding a frame, particularly with respect to a number of reference frames can be very computationally complex thereby driving size, cost, and power consumption of the encoder. Accordingly, a need exists for reducing complexity of searching of reference frames in video encoders.

SUMMARY

The examples of the system, method, and devices described herein each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description" one will understand how the disclosed features provide advantages that include more efficient, lower power, and/or faster video encoders.

One aspect comprises a method of processing multimedia data. The method comprises comparing a portion of a frame to a plurality of reference frames. The portion of the frame comprises a plurality of sub-portions. The method further comprises selecting a reference frame from the plurality of reference frames based on the comparison. The method further comprises processing at least one of the subportions based on the selected reference frame.

Another aspect comprises an apparatus for processing multimedia data. The apparatus comprises means comparing a portion of a frame to a plurality of reference frames. The portion of the frame comprises a plurality of sub-portions. The apparatus further comprises means for selecting a reference frame from the plurality of reference frames based on the comparison. The apparatus further comprises means for processing at least one of the subportions based on the selected reference frame.

Another aspect comprises an apparatus for processing multimedia data. The apparatus comprises a comparator configured to compare a portion of a frame to a plurality of reference frames. The portion of the frame comprises a plurality of sub-portions. The apparatus further comprises a selector configured to select a reference frame from the plurality of reference frames based on the comparison. The apparatus further comprises a processor configured to compare at least one of the subportions based on the selected reference frame.

One aspect comprises a multimedia data processor comprising a configuration to compare a portion of a frame to a plurality of reference frames. The portion of the frame comprises a plurality of sub-portions. The configuration is further to select a reference frame from the plurality of reference frames based on the comparison and process at least one of the subportions based on the selected reference frame.

Another aspect comprises a machine readable medium comprising instructions for processing multimedia data. The instructions upon execution cause a machine to compare a portion of a frame to a plurality of reference frames. The portion of the frame comprises a plurality of sub-portions. The instructions upon execution further cause a machine to select a reference frame from the plurality of reference frames based on the comparison and process at least one of the subportions based on the selected reference frame.

DETAILED DESCRIPTION

The following detailed description is directed to certain specific aspects of the invention. However, the invention can be embodied in a multitude of different ways as defined and covered by the claims. In this description, reference is made to the drawings wherein like parts are designated with like numerals throughout. In the following description, specific details are given to provide a thorough understanding of the aspects described. However, it will be understood by one of ordinary skill in the art that the aspects may be practiced without these specific details. For example, electrical components may be shown in block diagrams in order not to obscure the aspects in unnecessary detail. In other instances, such components, other structures and techniques may be shown in detail to further explain the aspects.

Moreover, it is to be recognized that depending on the embodiment, certain acts or events of any of the methods, processes, block diagrams, and flow charts described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially. It is further to be recognized that the methods, processes, block diagrams, and flow charts described herein may be repeated, either in whole or in part.

Aspects include systems and methods of improving processing in an encoder in a multimedia transmission system. Multimedia data may include one or more of motion video, audio, still images, or any other suitable type of audio-visual data. Aspects include an apparatus and method of encoding video data. For example, one aspect comprises a method of reduced reference frame search in video encoding. One such aspect comprises a method of reduced reference frame searching in a motion compensation method. In particular, it has been found that searching less than all of a set of reference frames according to one aspect desirably reduces the computational complexity of the motion compensation search without a substantial increase in the amount of noise or distortion in the encoded frame.

Figure 1:
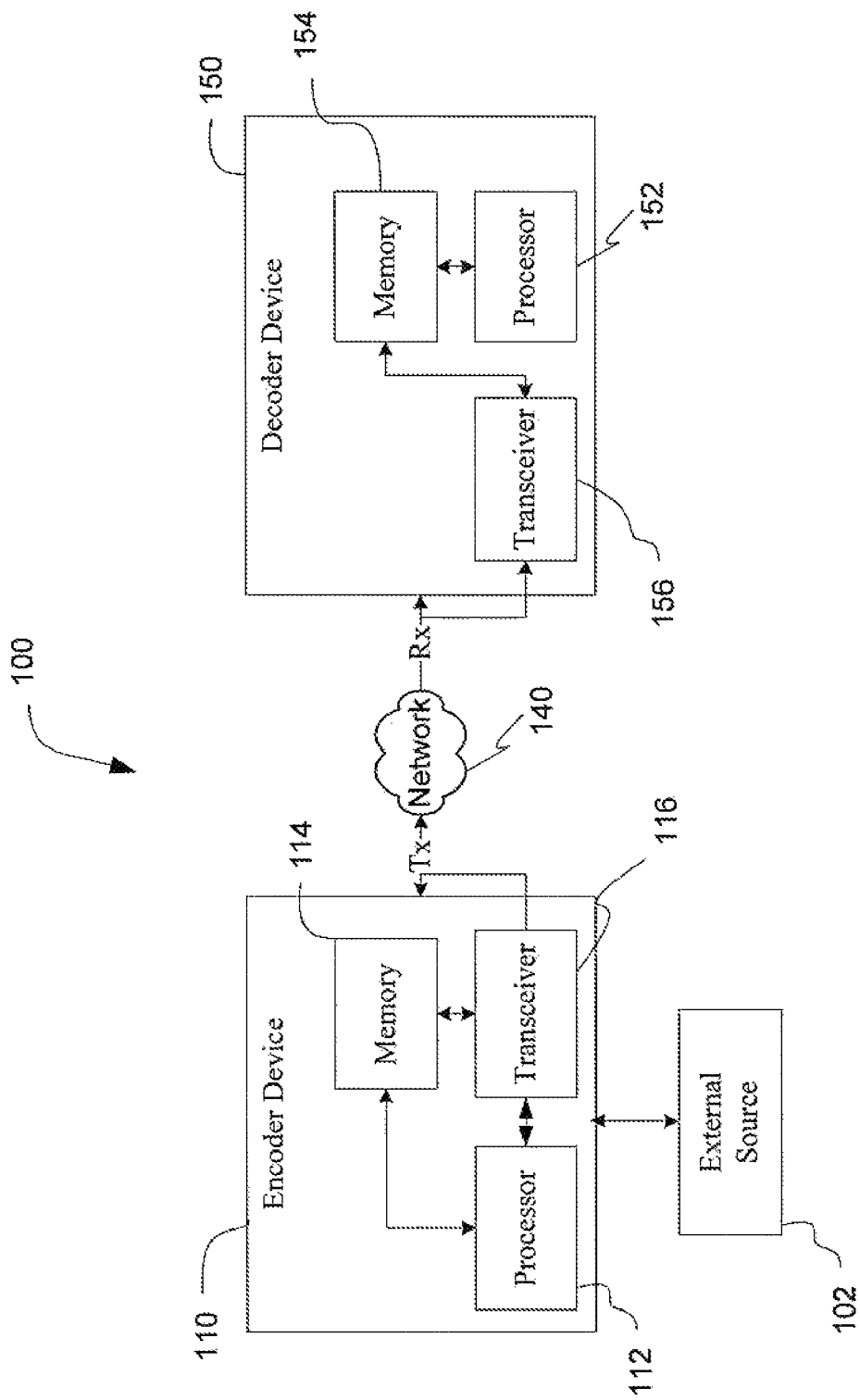
FIG. 1 is a functional block diagram illustrating a multimedia communications system according to one aspect.

FIG. 1 is a functional block diagram illustrating a multimedia communications system 100 according to one aspect.

The system 100 includes an encoder device 110 in communication with a decoder device 150 via a network 140. In one example, the encoder device receives a multimedia signal from an external source 102 and encodes that signal for transmission on the network 140.

In this example, the encoder device 110 comprises a processor 112 coupled to a memory 114 and a transceiver 116. The processor 112 encodes data from the multimedia data source and provides it to the transceiver 116 for communication over the network 140.

In this example, the decoder device 150 comprises a processor 152 coupled to a memory 154 and a transceiver 156. The processor 152 may include one or more of a general purpose processor or a digital signal processor. The memory 154 may include one or more of solid state or disk based storage. The transceiver 156 is configured to receive multimedia data over the network 140 and provide it to the processor 152 for decoding. In one example, the transceiver 156 includes a wireless transceiver. The network 140 may comprise one or more of a wired or wireless communication system, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1xEV-DO or 1xEV-DO Gold Multicast) system, an IEEE 802.11 system, a MediaFLO system, a DMB system, or a DVB-H system.

Figure 2:
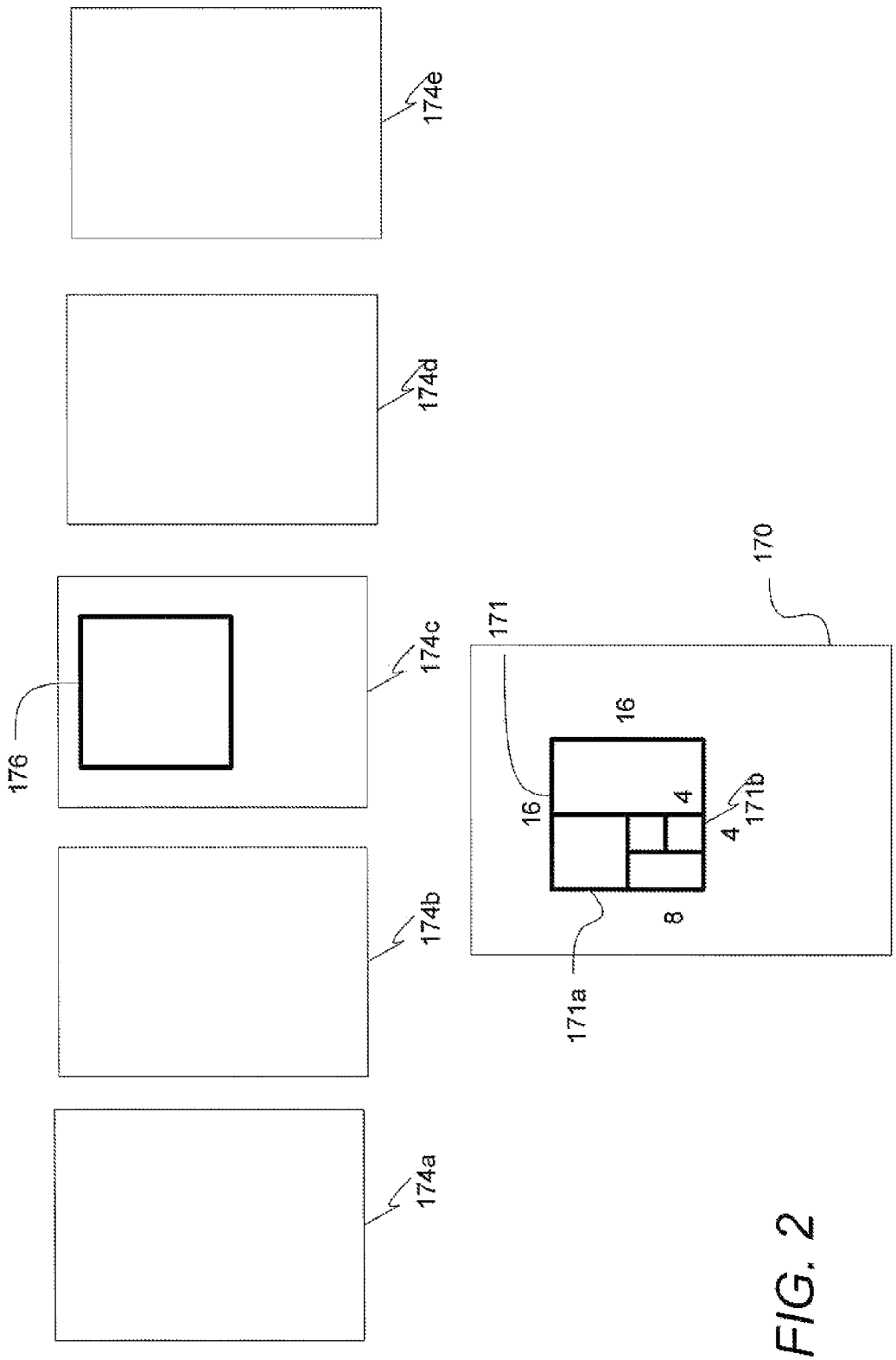
FIG. 2 graphically illustrates portions of a method of encoding a portion of a video frame in a system such as illustrated in FIG. 1.

FIG. 2 graphically illustrates an aspect of a method of encoding a portion of a video frame in a system such as illustrated in FIG. 1. As illustrated in FIG. 2, a frame 170 may be divided into a number of macroblocks 171. Each macroblock 171 comprises an array of pixels, e.g., a 16×16 array of pixels of the frame 170. Further, the encoder 110 may partition the macroblocks 171 into any number of smaller blocks such as the 8×8 subblock 171a, or the 4×4 subblock 171b. Optionally, the encoder 110 may vary the subblock sizes within the frame 170 and/or between encoded frames 170. Collectively, the macroblocks 171 and the partitions of macroblocks such as subblocks 171a are referred to herein as "blocks" and referred to collectively with reference to item 171 of FIG. 2.

Encoded video frames 170 (or blocks 171 of the frames 170) may be encoded without dependency on other frames (e.g., intramode) or predictively based on other encoded frames (e.g., intermode). The particular mode of encoding used for a portion of the frame 170 may be referred to as a "mode" (of encoding). The encoder 110 may encode different portions of the frame 170, e.g., different blocks 171 or subblocks 171, using different modes. For example, motion compensation algorithms may be used to encode the frame 170 or one or more blocks 171 of the frame 170. One example of the encoder 110 encodes the frame 170 in terms of blocks that include blocks of sizes such as 16×16, 16×8, 8×16, 8×8, 8×4, 4×8, 4×4 (but other sizes may be used). The encoded frame 170 may comprise a partition of the frame 170 into a set of encoded blocks 171 that encodes substantially all the pixels of the frame 170. The encoded blocks 171 may be of different sizes and selected based on a cost function that allows comparison of different encoding strategies based on a weighted average of factors such as encoded data size and resulting distortion of the image.

As noted above, one way of predicting video frames is using motion estimation algorithms that take advantage of temporal redundancy in video data to encode the frame 170 based on at least partially matching blocks 171 from one frame to another frame, e.g., a reference frame. Motion estimation algorithms identify blocks 176 in one or more reference frames 174 that are similar to (e.g., at least partially match) the blocks 171 of the frame 170 but possibly shifted in location in the encoded frame 174. Note that in various aspects, motion estimation algorithms may use reference frames 174 that were previous to the current frame 170 in time, after the frame 170 in time, or both. The blocks 171 of the frame 170 are encoded in terms of a motion vector indicative of positional differences between the block 171 and the block 176 and residual data indicative of the differences between the pixels the block 171 of the frame 170 relative to a reference block (e.g., block 176 of a reference frame 174c) found in a list of one or more references frames 174 (e.g., references frames 174a, 174b, 174c, 174d, and 174e). The reference frames 174 may be a temporally ordered list of frames that are before or after the frame 170 in the video signal. As shown in FIG. 2, the encoder 110 may compare the block 171a of the frame 170 to the reference frames 174 to identify corresponding blocks such as the block 176 in the frame 174c.

The encoder 110 may calculate motion compensation data, e.g., motion vectors and residuals, for each of a group of blocks such as 16×16, 16×8, 8×16, 8×8, 8×4, 4×8, and 4×4 blocks (partitions) of the blocks 171. The encoder 110 may first calculate the motion compensation data for larger blocks 171, e.g., 16×16, then for calculate the motion compensation data for each subblock of the larger blocks, e.g., 16×8, 8×8, etc. The encoder 110 can select a particular partition or set of the blocks 171 of one or more sizes that covers substantially all of the frame 170. The encoder 110 may select particular blocks and respective predictive data for each portion of the frame 170 based on a cost function, e.g., a rate-distortion (RD) function, that comprises a measure of that trades off between encoding size and distortion based on the encoding data size of a frame or portion of the frame using a particular set of motion vectors and residuals for a particular set of the blocks of the frame and corresponding estimates of the resulting image distortion. Encoders 110 may use any suitable cost function, including those known in the art. For example, suitable cost functions are disclosed in "Rate-Constrained Coder Control and Comparison of Video Coding Standards," IEEE TRANSACTIONS ON CIRCUITS AND SYSTEMS FOR VIDEO TECHNOLOGY, VOL. 13, NO. 7, 688 (July 2003). The cost functions may comprise, for example, rate-distortion functions, smallest residue, and/or sum of absolute difference (SAD) functions.

Figure 3:
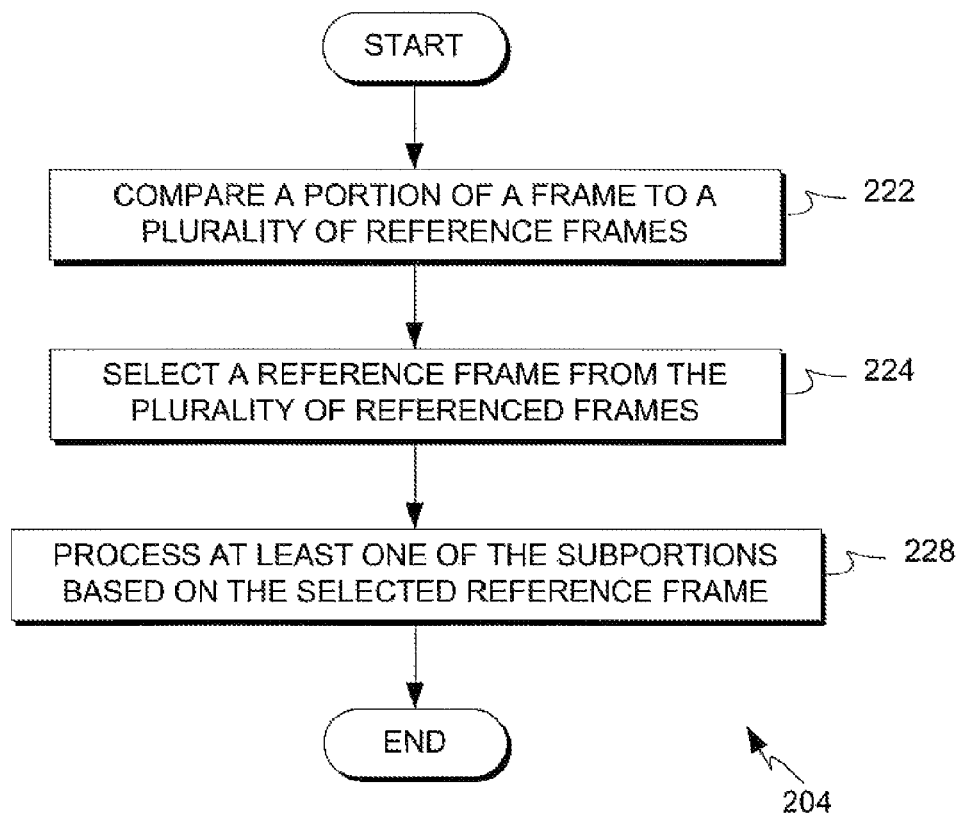
FIG. 3 is a flow chart illustrating one example of a method of encoding a portion of a video stream in a system such as illustrated in FIG. 1.

FIG. 3 is a flow chart illustrating in an example of a method 204 of encoding multimedia data. The method begins at a block 222 in which the encoder 110 compares a block of a frame, e.g., the block 171a of frame 170 as illustrated in FIG. 2, to each of a list of a reference frames, e.g., frames 174 of FIG. 2 to identify matching data for encoding the block 171a. The encoder 110 may search each of the reference frames 174 for portions such as the block 176 of the frame 174c that at least partially match the block 171a. Next at a block 224, the encoder 110 selects one of the reference frames 174, e.g., the reference frame 174c, that has the lowest encoding cost function for intercoding the block 171a. In addition, the encoder 110 may optionally select a subset of the reference frames 174 based on the selected reference frame. For example, the subset may include only the selected reference frame, e.g., the reference frame 174c. In another example, in which the reference frames 174 comprise a temporal sequence of frames 1 to N, the selected reference frame 174 is frame j in the sequence so that the subset includes the reference frames j−M to j+M, where M is an integer that parameterizes the size of the subset. For example, if M=1, then the subset includes frames j−1 to j+1, e.g., the identified reference frame and the reference frames adjacent to the identified reference frame in the series of frames from 1 to N. It is to be recognized that M=1 is merely illustrative, and that aspects may use other values of the subset size parameter M. Moreover, it is to be recognized that the range may be have a lower limit of the frame at the lower end of the sequence, e.g., the frame identified as 1 and an upper limit of the frame at the upper end of the sequence, e.g., the frame N.

Next at a block 228, the encoder 110 process at least one of the subportions, e.g., subblocks, based on the selected reference frame. The encoder may process the subblocks by comparing the subblocks of the frame 170 to the selected reference frame to find an at least partially matching portion 176 of the reference frame 174. For example, the encoder 110 may compare each subblock of block 171a, e.g., subblocks of size 16×8 and 8×16 only with the selected reference frame 174. Thus, the encoder 110 does not need to search all five of the reference frames 174 to encode the subblocks, thereby reducing the processing complexity while not substantially increasing distortional effects.

Figure 5:
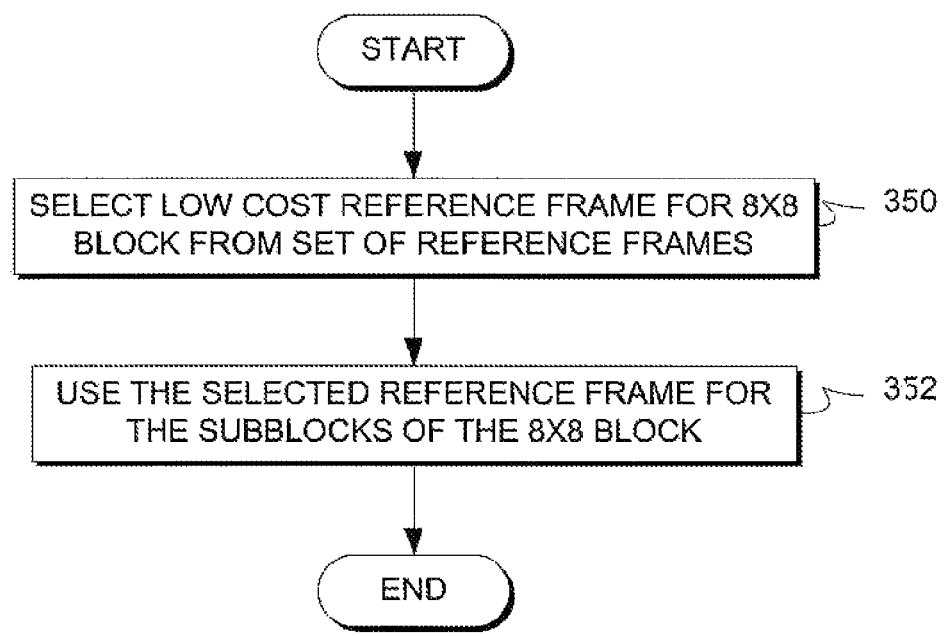
FIG. 5 is a flow chart illustrating in more detail a portion of one example of the method illustrated in FIG. 3.
Figure 6:
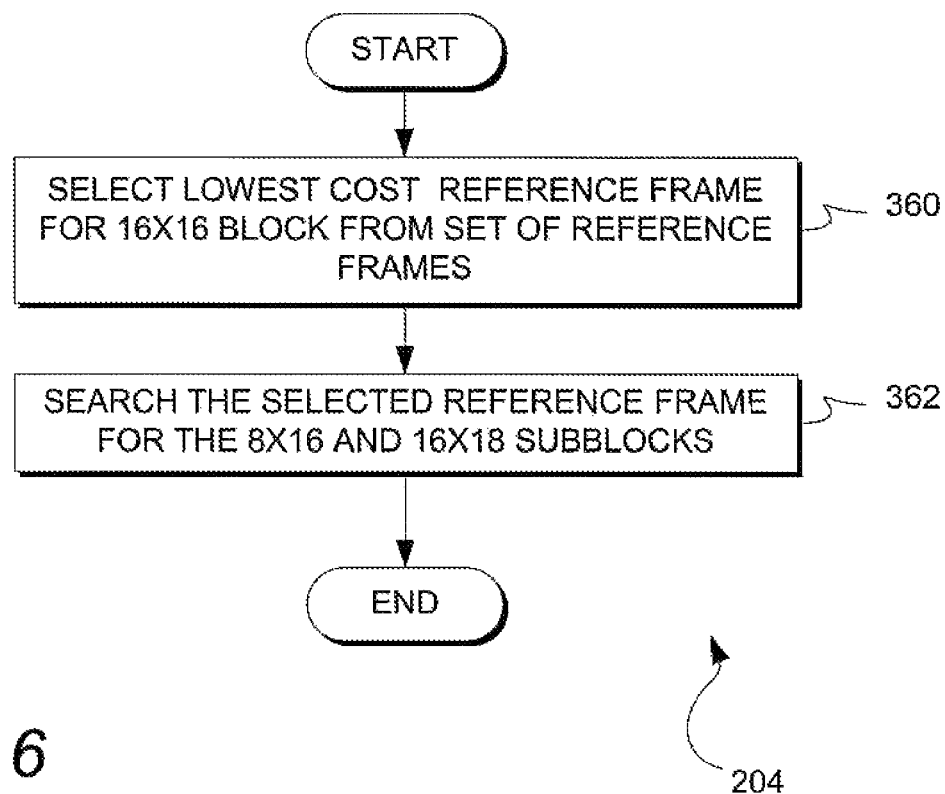
FIG. 6 is a flow chart illustrating in more detail a portion of another example of the method illustrated in FIG. 3.
Figure 7:
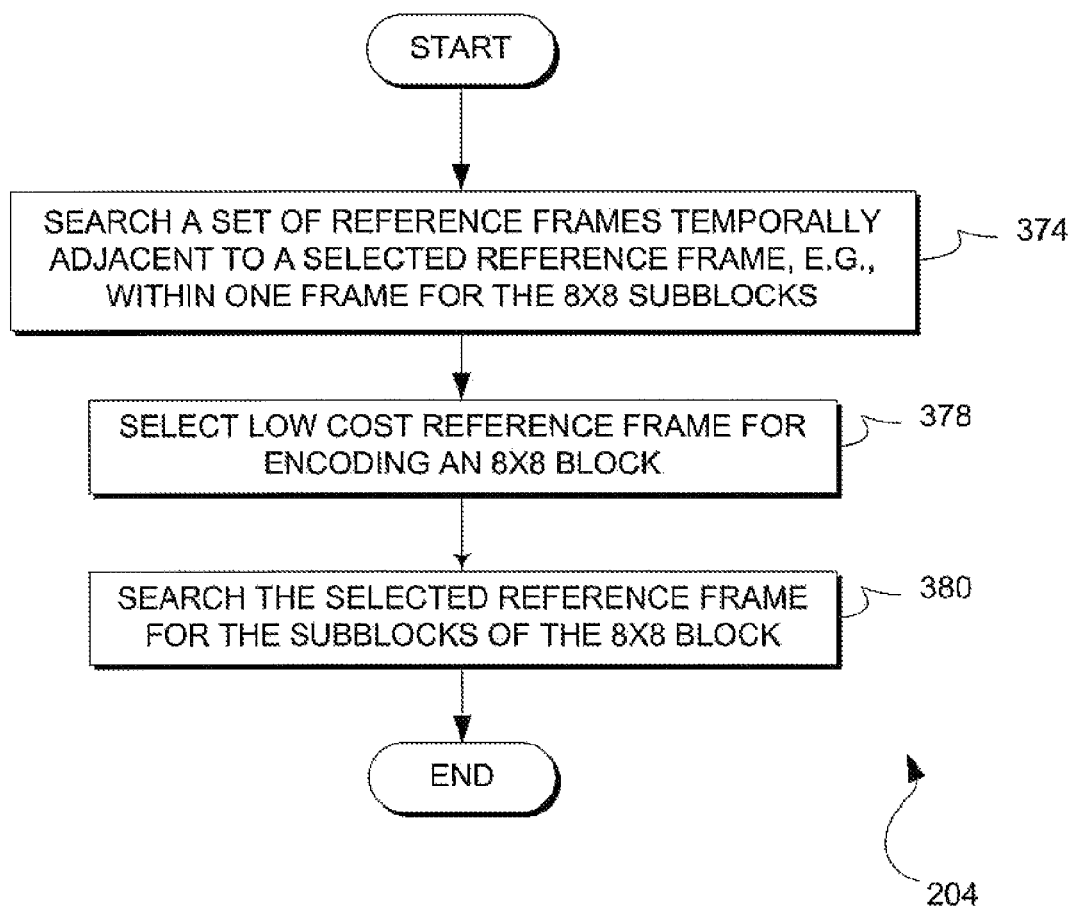
FIG. 7 is a flow chart illustrating in more detail a portion of another example of the method illustrated in FIG. 3.

In addition, the encoder may also compare the subblocks to a subset of the reference frames 174 as discussed with reference to the method block 224. For example, if the frame 174c is identified as the reference frame for the 8×8 block 171a, the subset of the reference frames may comprise the frame 174c or a range of frames adjacent to frame 174c in time, e.g., frames 174b to 174d. Further, the encoder 110 may be configured to perform combinations of: searching all reference frames, only a selected reference frames, or only a subset of the reference frames. The encoder 110 may select these combinations based on, for example, the size of the blocks being searched. FIGS. 5, 6, and 7 illustrate particular examples of such combinations.

It has been found that searching less than all of the reference frames 174 according to the above disclosed method desirably reduces the computational complexity of the motion compensation search without a substantial increase in the amount of noise or distortion in the encoded frame 170. The method 204 may be repeated for different blocks or subblocks 171 of the frame 170.

Figure 4:
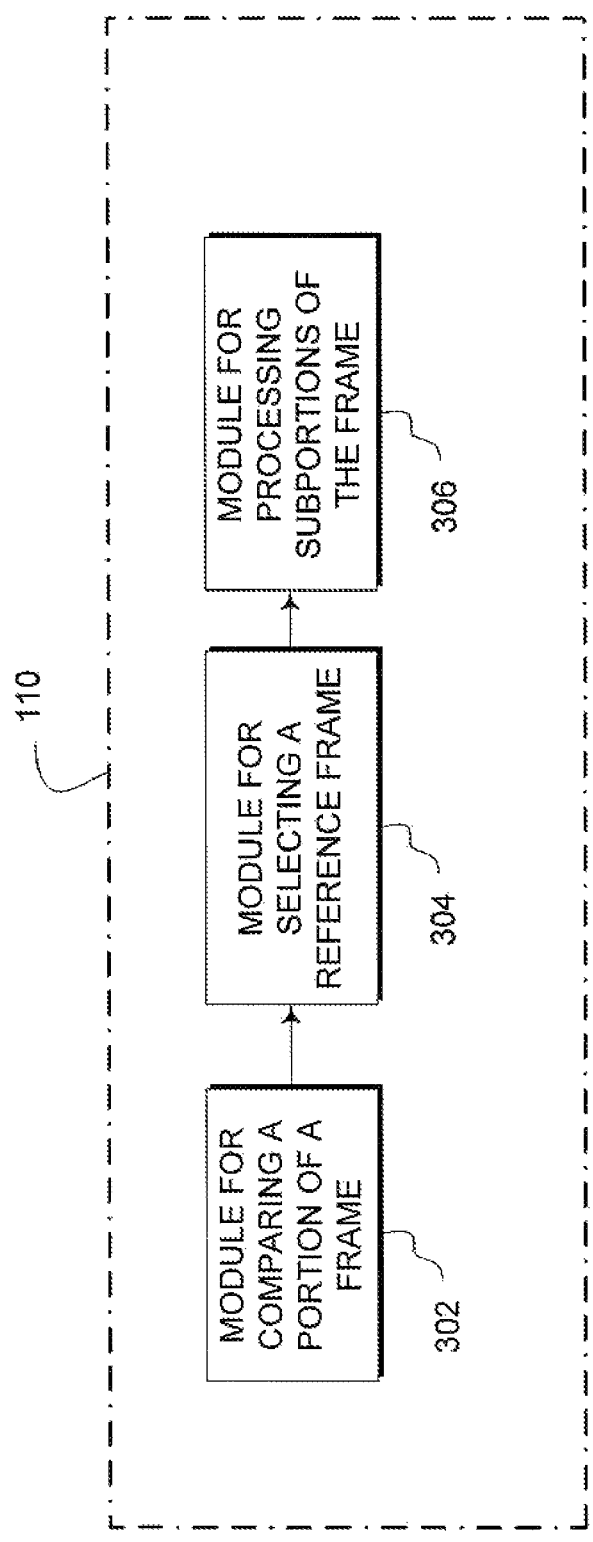
FIG. 4 is a functional block diagram illustrating an example of an apparatus for processing video data in accordance with the method illustrated in FIG. 3.

FIG. 4 is a block diagram illustrating an example of an apparatus for processing video data in accordance with the method illustrated in FIG. 3. In particular, FIG. 3 illustrates an example of the encoder 110. The encoder 100 comprises a module 302 for comparing a portion of a frame to a plurality of reference frames, a module 304 for selecting a reference frame from the plurality of referenced frames, and a module 306 for processing at least one of the subportions based on the selected reference frame. The module 302 for comparing a portion of a frame may be configured to compare a portion of a frame to a plurality of reference frames. For example, the module 302 may perform the acts discussed with reference to the block 222 of FIG. 3. The module 304 for selecting a reference frame may be configured to select a reference frame, e.g., 174c, from the plurality of reference frames 174 (see FIG. 2). For example, the module 304 may perform the acts discussed with reference to the block 224 of FIG. 3. The module 304 may select the reference frame 174 based on a cost function as described above. The reference frame selecting module 304 may also be configured to select a subset of the reference frames based on the identified reference frame, e.g., frames j−1 to j+1, where the reference frame is identified as frame j in a time-sequenced series of reference frames. The module 306 for processing subportions of the frame may be configured to process at least one of the subportions based on the selected reference frame 174, e.g., the module 306 may perform the acts described with reference to the block 228 of FIG. 3.

Table 1, below, illustrates simulated results for a number of examples of encoding methods in which the search of the reference frames 174 is reduced for searching blocks of various sizes. Table 1 compares the costs of searching all N reference frames for all block sizes versus three examples of the methods of reduced reference frame searching disclosed herein. Table 1 compares bitrates, peak signal to noise ratio (PSNR), and a "penalty," e.g., increased signal to noise ratio for reduced searching methods, for a number of different video signals from animation, music video, news, general sports, a cable sports channel, a cable movie channel, and a general or typical cable television signal.

FIG. 5 is a flow chart showing in more detail a first example of the method 204 of FIG. 3. This first example corresponds to Example A in Table 1 and comprises a method of reducing reference frames in sub-8×8 modes. For example, all N reference frames are searched at 350 for encoding data for a 8×8 subblock. A particular reference frame 174 is selected, e.g., frame j with the lowest cost function value for encoding the 8×8 subblock. In the simulation data of Table 1, N equals 5 reference frames. Next at 352, the simulated encoder 110 only searches the selected frame j for encoding data for subblocks of the 8×8 block (e.g., 8×4, 4×4, 4×8 blocks).

FIG. 6 is a flow chart showing in more detail a second example of the method 204 of FIG. 3. The second example corresponds to Example B in Table 1 and comprises a method of providing a reduction of reference frames searched for encoding data for 16×8 blocks and 8×16 blocks. For example, at 360, the encoder 110 searches N reference frames for encoding data for a 16×16 block and identifies frame j as providing a low value of a cost function for encoding the 16×16 block. The lowest value may be the lowest calculated cost value. Next at 362, for 16×8 and 8×16 subblocks of the 16×16 block, the encoder 110 only searches the selected reference frame j for encoding data.

FIG. 7 is a flow chart showing in more detail a third example of the method 204 of FIG. 3. The third example corresponds to Example C and comprises a method of reducing reference frames used for encoding 16×8, 8×16, 8×8 blocks and sub-8×8 blocks. The method of Example C includes the acts associated with items 360 and 362 of FIG. 6 to reduce searching for 16×8 and 8×16 blocks by searching only the selected reference frame j. Next after computing the encoding cost based on reduced reference frames for the 16×8 and 8×16 blocks at 362, for each of the 8×8 subblocks of the 16×8 blocks and the 8×16 blocks, the encoder 110 searches, at 374 in FIG. 7, a set of reference frames temporally adjacent to the selected reference frame j, e.g., within one frame for the 8×8 subblocks, frames from max(0, j−1) to min(N,j+1). Moving to 378, the encoder 110 selects the reference frame i having the lowest encoding cost for each 8×8 block. Next at 380, for the subblocks of the 8×8 block, the encoder 110 searches only the reference frame i for encoding data.

The simulation data in Table 1 was generated assuming adaptive frame encoding and search range of 32×32 pixels.

TABLE 1

| Content type | | Search all N reference frames | Example A | Example A and B | Example C |
|---|---|---|---|---|---|
| Animation | Bitrate (kpbs) | 224.1024 | 223.9125 | 223.4455 | 223.8705 |
| | PSNR (dB) | 36.48065 | 36.40682 | 36.36378 | 36.26227 |
| | Penalty (dB) | 0 | 0.070032 | 0.103732 | 0.213742 |
| Music | Bitrate (kpbs) | 242.9459 | 241.1545 | 240.2382 | 240.4 |
| | PSNR (dB) | 36.12607 | 36.00855 | 35.93545 | 35.8716 |
| | Penalty (dB) | 0 | 0.081692 | 0.136466 | 0.203552 |
| News | Bitrate (kpbs) | 201.852 | 202.3049 | 201.5107 | 202.9838 |
| | PSNR (dB) | 38.31485 | 38.46045 | 38.34122 | 38.38856 |
| | Penalty (dB) | 0 | −0.13654 | −0.0332 | −0.05107 |
| Sports | Bitrate (kpbs) | 250.3261 | 250.5926 | 250.8334 | 250.9431 |
| | PSNR (dB) | 33.76418 | 33.70399 | 33.67024 | 33.59318 |
| | Penalty (dB) | 0 | 0.06552 | 0.104086 | 0.18334 |
| Cable Sports Channel | Bitrate (kpbs) | 258.1204 | 257.9902 | 257.4172 | 258.2838 |
| | PSNR (dB) | 32.12103 | 32.05273 | 31.9976 | 31.93628 |
| | Penalty (dB) | 0 | 0.065696 | 0.109366 | 0.188018 |
| Cable Movie Channel | Bitrate (kpbs) | 237.925 | 238.8215 | 237.9826 | 238.5083 |
| | PSNR (dB) | 37.6586 | 37.71595 | 37.61822 | 37.53846 |
| | Penalty (dB) | 0 | −0.03942 | 0.041532 | 0.131806 |

TABLE 1-continued

| Content type | | Search all N reference frames | Example A | Example A and B | Example C |
|---|---|---|---|---|---|
| General Cable Video | Bitrate (kpbs) | 237.567 | 234.5901 | 236.9851 | 236.7844 |
| | PSNR (dB) | 35.64185 | 35.47642 | 35.5201 | 35.43013 |
| | Penalty (dB) | 0 | 0.105892 | 0.110112 | 0.196068 |
| Avg. Penalty (dB) | | 0 | 0.03041 | 0.081728 | 0.152207 |

The three illustrated examples provide different tradeoffs between reference frame searching complexity and encoding quality. Among them, the method of Example C has the lowest complexity at a PSNR loss of only about 0.15 dB.

In view of the above, one will appreciate that the invention overcomes the problem of encoding multimedia data such as video data. For example, the reduced search of reference frames according to one aspect reduces the computational complexity of video encoding without a substantial loss of video fidelity. Therefore, video encoders can use lower power, lower latency, and/or less complex processors and associated electronics.

Those of skill will recognize that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present invention. Various modifications to these aspects will be readily apparent to those skilled in the art, and the generic principles defined herein may be applied to other embodiments without departing from the spirit or scope of the invention. Thus, the present invention is not intended to be limited to the aspects shown herein but is to be accorded the widest scope consistent with the principles and novel features disclosed herein.

While the above detailed description has shown, described, and pointed out novel features of the invention as applied to various aspects, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:
1. A method of processing multimedia data, comprising:
comparing a portion of a frame to a list of a plurality of reference frames, wherein the portion of the frame comprises a plurality of sub-portions;
selecting a reference frame for the portion of the frame from the list of the plurality of reference frames based on the comparison;
comparing a first one of the plurality of sub-portions to a first subset of the list of the plurality of reference frames, wherein the first subset includes the selected reference frame for the portion of the frame, and wherein the first subset is selected based on a first size of the first sub-portion; and
comparing a second one of the plurality of sub-portions to a second subset of the list of the plurality of reference frames, wherein the second subset includes the selected reference frame for the portion of the frame and one or more additional reference frames selected from the list of the plurality of reference frames based on the selected reference frame for the portion of the frame, wherein the second subset is selected based on a second size of the second sub-portion, wherein the second size is different than the first size, and wherein the first subset is different than the second subset.

2. The method of claim 1, further comprising processing the first and second sub-portions based on the first and second subsets of reference frames.

3. The method of claim 2, wherein processing the at least one of the sub-portions comprises comparing the at least one of the sub-portions to at least part of the selected reference frame.

4. The method of claim 1, wherein the plurality of reference frames define a temporal ordering and wherein at least one of the first and second subsets of the reference frames comprises at least two adjacent frames in the temporal ordering.

5. The method of claim 1, wherein the portion comprises a macro-block and the sub-portions comprise subblocks.

6. The method of claim 1, wherein the portion comprises a subblock and the sub-portions comprise subblocks of the subblock.

7. The method of claim 1, further comprising calculating an encoding metric for at least the portion of the frame.

8. The method of claim 7, wherein the first and second subsets of reference frames are selected based at least partly on the encoding metric.

9. The method of claim 7, wherein the encoding metric is based on at least one of distortion of encoded data and size of encoded data.

10. The method of claim 1,
wherein comparing a first one of the plurality of sub-portions to a first subset of the plurality of reference frames comprises comparing the first one of the plurality of sub-portions to the reference frame selected for the portion of the frame, and
wherein comparing a second one of the plurality of sub-portions to a second subset of the plurality of reference frames comprises comparing the second one of the plurality of sub-portions to the reference frame selected for the portion of the frame and at least one additional reference frame.

11. The method of claim 1, wherein the first subset comprises a first number of reference frames and the second subset comprises a second number of reference frames, and wherein the first number of reference frames is different than the second number of reference frames.

12. An apparatus for processing multimedia data, comprising:
means comparing a portion of a frame to a list of a plurality of reference frames, wherein the portion of the frame comprises a plurality of sub-portions;
means for selecting a reference frame for the portion of the frame from the list of the plurality of reference frames based on the comparison;
means for comparing a first one of the plurality of sub-portions to a first subset of the list of the plurality of reference frames, wherein the first subset includes the selected reference frame for the portion of the frame, and wherein the first subset is selected based on a first size of the first sub-portion; and
means for comparing a second one of the plurality of sub-portions to a second subset of the list of the plurality of reference frames, wherein the second subset includes the selected reference frame for the portion of the frame and one or more additional reference frames selected from the list of the plurality of reference frames based on the selected reference frame for the portion of the frame, wherein the second subset is selected based on a second size of the second sub-portion, wherein the second size is different than the first size, and wherein the first subset is different than the second subset.

13. The apparatus of claim 12, further comprising means for processing the first and second sub-portions based on the first and second subsets of reference frames.

14. The apparatus of claim 13, wherein said processing means is further configured to compare the at least one of the sub-portions to at least part of the selected reference frame.

15. The apparatus of claim 12, wherein the plurality of reference frames define a temporal ordering and wherein at least one of the first and second subsets of the reference frames comprise at least two adjacent frames in the temporal ordering.

16. The apparatus of claim 12, wherein the portion comprises a macro-block and the sub-portions comprise sub-blocks.

17. The apparatus of claim 12, wherein the portion comprises a subblock and the sub-portions comprise subblocks of the subblock.

18. The apparatus of claim 12, wherein the selecting means is further configured to calculate an encoding metric for at least the portion of the frame.

19. The apparatus of claim 18, wherein selecting means is configured to select the reference frame based at least partly on the encoding metric.

20. The apparatus of claim 18, wherein the first and second subsets of reference frames are selected based at least partly on the encoding metric.

21. The apparatus of claim 18, wherein the encoding metric is based on at least one of distortion of encoded data and size of encoded data.

22. The apparatus of claim 12,
wherein the means for comparing a first one of the plurality of sub-portions to a first subset of the plurality of reference frames is configured to compare the first one of the plurality of sub-portions to the reference frame selected for the portion of the frame, and
wherein the means for comparing a second one of the plurality of sub-portions to a second subset of the plurality of reference frames is configured to compare the second one of the plurality of sub-portions to the reference frame selected for the portion of the frame and at least one additional reference frame.

23. The method of claim 12, wherein the first subset comprises a first number of reference frames and the second subset comprises a second number of reference frames, and wherein the first number of reference frames is different than the second number of reference frames.

24. An apparatus for processing multimedia data, comprising:
a comparator configured to compare a portion of a frame to a list of a plurality of reference frames, wherein the portion of the frame comprises a plurality of sub-portions; and
a selector configured to select a reference frame for the portion of the frame from the list of the plurality of reference frames based on the comparison,
wherein the comparator compares a first one of the plurality of sub-portions to a first subset of the list of the plurality of reference frames, wherein the first subset includes the selected reference frame for the portion of the frame, and wherein the first subset is selected based on a first size of the first sub-portion, and
wherein the comparator compares a second one of the plurality of sub-portions to a second subset of the list of the plurality of reference frames, wherein the second subset includes the selected reference frame for the portion of the frame and one or more additional reference frames selected from the list of the plurality of reference frames based on the selected reference frame for the portion of the frame, wherein the second subset is selected based on a second size of the second sub-portion, wherein the second size is different than the first size, and wherein the first subset is different than the second subset.

25. The apparatus of claim 24, further comprising a processor that is configured to:
  process the first and second sub-portions based on the first and second subsets of reference frames.

26. The apparatus of claim 24, wherein the plurality of reference frames define a temporal ordering and wherein at least one of the first and second subsets of reference frames comprise at least two adjacent frames in the temporal ordering.

27. The apparatus of claim 24, wherein the portion comprises a macro-block and the sub-portions comprise sub-blocks.

28. The apparatus of claim 24, wherein the portion comprises a subblock and the sub-portions comprise subblocks of the subblock.

29. The apparatus of claim 24, wherein said selector is further configured to calculate an encoding metric for at least the portion of the frame.

30. The apparatus of claim 24, wherein the first and second subsets of reference frames are selected based at least partly on the encoding metric.

31. The apparatus of claim 24, wherein the encoding metric is based on at least one of distortion of encoded data and size of encoded data.

32. The apparatus of claim 24, wherein the comparator is further configured to compare the first one of the plurality of sub-portions to the reference frame selected for the portion of the frame and compare the second one of the plurality of sub-portions to the reference frame selected for the portion of the frame and at least one additional reference frame.

33. The method of claim 24, wherein the first subset comprises a first number of reference frames and the second subset comprises a second number of reference frames, and wherein the first number of reference frames is different than the second number of reference frames.

34. A multimedia data processor configured to:
  compare a portion of a frame to a list of a plurality of reference frames, wherein the portion of the frame comprises a plurality of sub-portions;
  select a reference frame for the portion of the frame from the list of the plurality of reference frames based on the comparison;
  compare a first one of the plurality of sub-portions to a first subset of the list of the plurality of reference frames, wherein the first subset includes the selected reference frame for the portion of the frame, and wherein the first subset is selected based on a first size of the first sub-portion; and
  compare a second one of the plurality of sub-portions to a second subset of the list of the plurality of reference frames, wherein the second subset includes the selected reference frame for the portion of the frame and one or more additional reference frames selected from the list of the plurality of reference frames based on the selected reference frame for the portion of the frame, wherein the second subset is selected based on a second size of the second sub-portion, wherein the second size is different than the first size, and wherein the first subset is different than the second subset.

35. A non-transitory computer-readable medium storing computer executable instructions for processing multimedia data, wherein the computer executable instructions upon execution cause a processor to:
  compare a portion of a frame to a list of a plurality of reference frames, wherein the portion of the frame comprises a plurality of sub-portions;
  select a reference frame for the portion of the frame from the list of the plurality of reference frames based on the comparison;
  compare a first one of the plurality of sub-portions to a first subset of the list of the plurality of reference frames, wherein the first subset includes the selected reference frame for the portion of the frame, and wherein the first subset is selected based on a first size of the first sub-portion; and
  compare a second one of the plurality of sub-portions to a second subset of the list of the plurality of reference frames, wherein the second subset includes the selected reference frame for the portion of the frame and one or more additional reference frames selected from the list of the plurality of reference frames based on the selected reference frame for the portion of the frame, wherein the second subset is selected based on a second size of the second sub-portion, wherein the second size is different than the first size, and wherein the first subset is different than the second subset.

* * * * *